March 4, 1969     R. C. KAMP     3,430,444

VARIABLE VOLUME ACCUMULATOR SEAT SUSPENSION

Filed April 17, 1967     Sheet 1 of 3

INVENTOR
RONALD C. KAMP

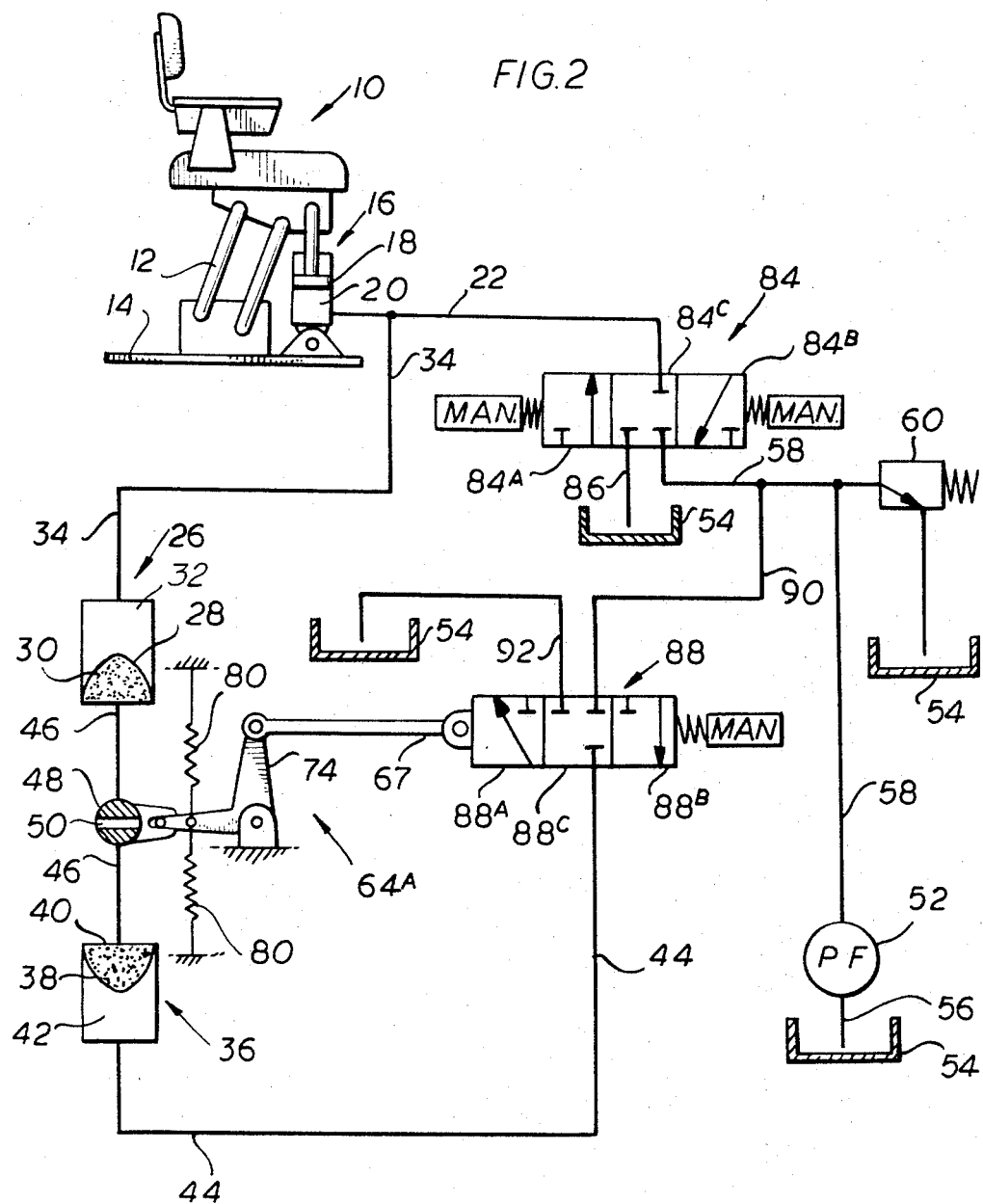

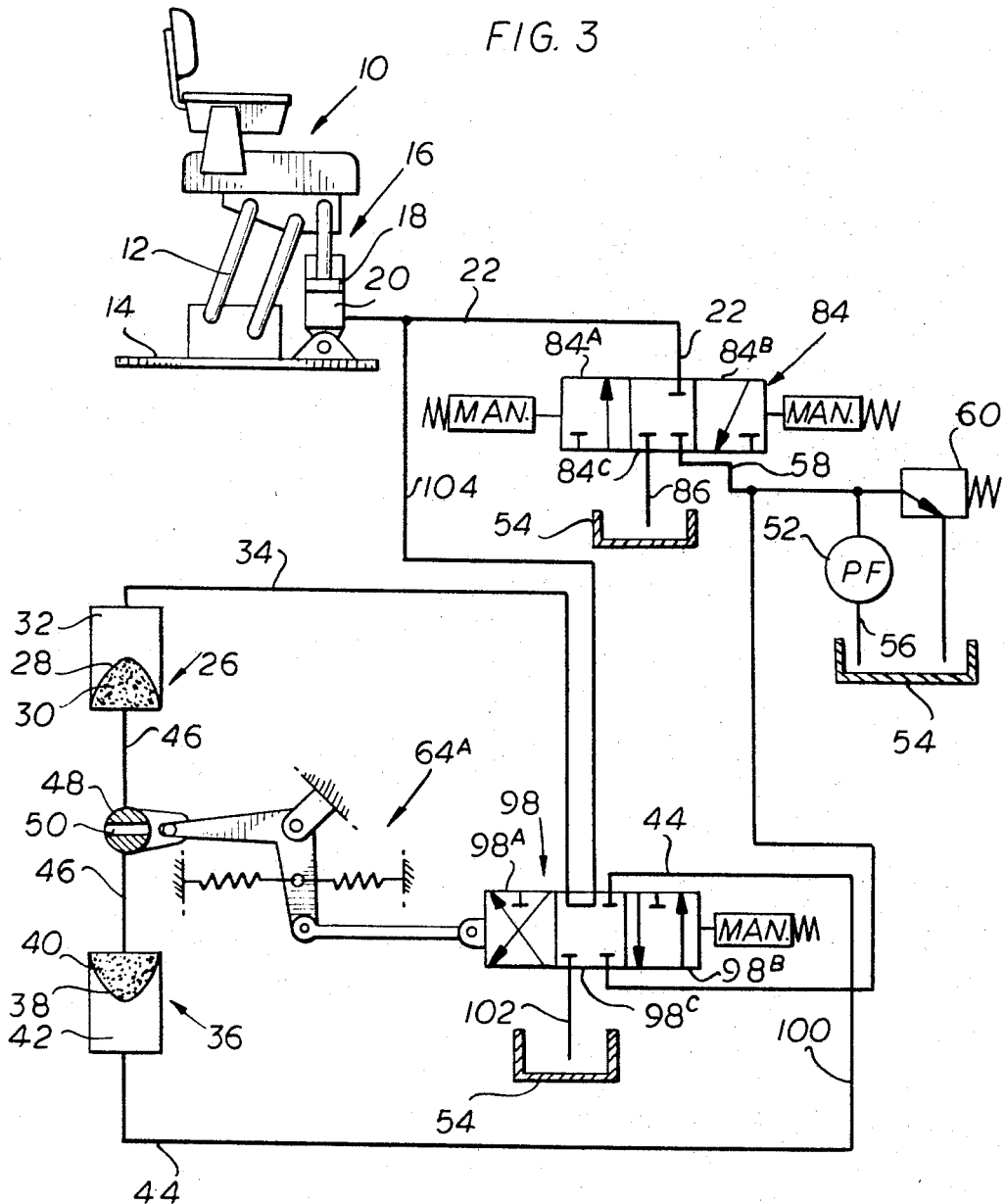

United States Patent Office 3,430,444
Patented Mar. 4, 1969

3,430,444
VARIABLE VOLUME ACCUMULATOR SEAT SUSPENSION
Ronald C. Kamp, Wilmette, Ill., assignor to International Harvester Company, Chicago, Ill., a corporation of Delaware
Filed Apr. 17, 1967, Ser. No. 631,353
U.S. Cl. 60—51    13 Claims
Int. Cl. B60n *1/02;* F16m *13/00;* F15c *4/00*

ABSTRACT OF THE DISCLOSURE

A suspension for a vehicle seat having a seat assembly supported by a linkage from the vehicle, a single acting hydraulic ram pivotally secured between the assembly and the vehicle, a first accumulator with its hydraulic chamber communicating with the ram, a second accumulator with its gas chamber capable of communicating with the gas chamber of the first accumulator, valve means for connecting and disconnecting said gas chambers, and means for transferring gas between the gas chambers when the valve means is positioned to connect them.

Background and summary of the invention

The present invention relates to support stands generally, and more particularly, to support stands having a surface resiliently supported by a fluid spring.

The desirability of providing a suspension means for a vehicle seat, particularly those in the commercial class, such as a farm tractor, with a means for varying the spring rate has long been recognized. Heretofore, changes in the rate, i.e., the amount of movement for travel of the seat when subjected to a given force, has generally been accomplished mechanically by changing the length of a lever arm or hydraulically by metering the flow of hydraulic fluid to and from a fluid spring or by effecting a change in the precharge or static pressure of a fluid spring. Both of these methods have undesirable limitations. The former requires complicated linkage which when worn, rattle and introduce side or lateral movement, usually are restricted to discrete steps or changes rather than being infinitely variable, and require considerable physical effort and/or awkward manipulation by the operator to effect changes while seated. Either of the purely hydraulic approaches results in cavitation within the hydraulic ram incorporated into the seat suspension linkage when certain, sudden movements are encountered.

It is, therefore, an object of the present invention to provide a suspension for a vehicle seat which permits a change in the spring rate while obviating the limitations of the prior art.

It is also an object of this invention to provide a seat suspension which permits the operator to quickly and easily change the spring rate while seated.

It is also an object to provide a means for varying the spring rate of a hydraulic seat suspension which minimizes the possibility of cavitation, which does not relay upon metering fluid flow and which achieves effective variation in the spring rate independent of the seat height.

Brief description of the drawings

FIGURE 2 is a view similar to FIGURE 1 but illustrating another embodiment of the present invention.

FIGURE 3 is a view similar to the preceding figures illustrating still another embodiment of the present invention.

Description of the preferred embodiments

Figure 1:
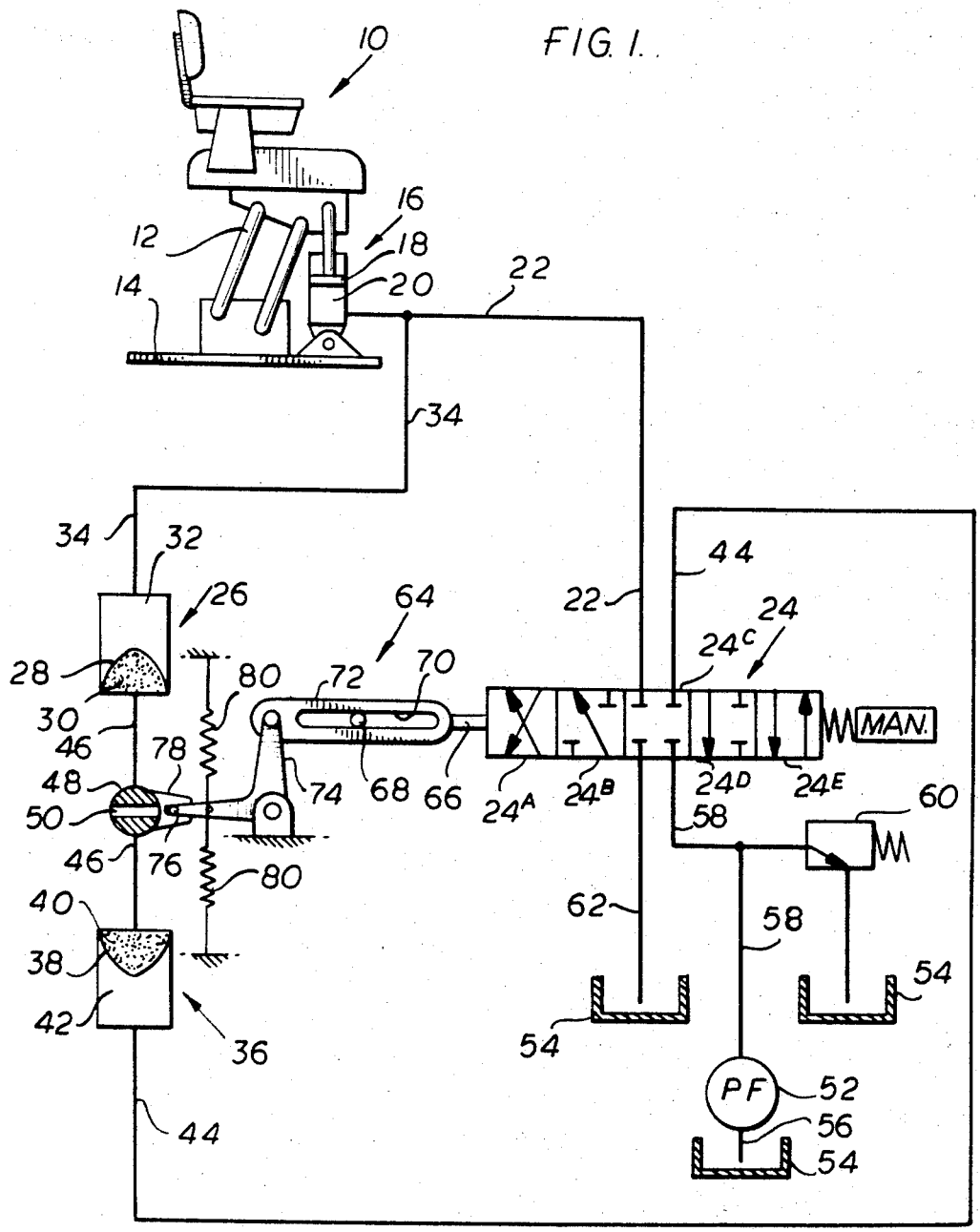
FIGURE 1 is a schematic representation, utilizing standard JIC symbols, illustrating a preferred embodiment of the present invention.

In the embodiment shown in FIGURE 1, a seat assembly, generally indicated at 10 is supported by a linkage 12 from a base member 14 which, for example, may be a portion of the frame of a vehicle. A single acting hydraulic ram 16 is pivotally connected between the seat assembly 10 and the base member 14, and includes a piston 18 which defines a working chamber 20. A conduit 22 connects the working chamber with a five-position valve 24. A springing or suspension accumulator 26 having a movable member 28, which separates the accumulator into a gas chamber 30 and a hydraulic chamber 32, is connected with its hydraulic chamber 32 in communication with the working chamber 20 through conduits 34 and 22. A reserve accumulator 36 having a movable member 38 which separates the accumulator into a gas chamber 40 and a hydraulic chamber 42 has its hydraulic chamber 42 connected to the valve 24 through a conduit 44. The gas chambers 30 and 40 are connected by a conduit 46, which conduit has a rotary valve 48 interposed therein. The rotary valve 48 has a passage 50 which when properly oriented provides fluid communication between the gas chambers 30 and 40 and which when oriented as shown in FIGURE 1 blocks or prevents fluid communication between the gas chambers. The operation of this rotary valve 48 will be more completely described hereinafter. A hydraulic pump 52, which draws hydraulic fluid from a reservoir 54 through a conduit 56, supplies hydraulic fluid under pressure to the valve 24 through a conduit 58. A suitable pressure relief circuit, including a conventional relief valve means 60, is provided to return excess fluid to the reservoir 54. The valve 24 is suitably ported to provide a connection with the reservoir 54 through a conduit 62. The valve 24, which is illustrated schematically in FIGURE 1, has five positions represented by the five blocks identified as 24*a*, 24*b*, 24*c*, 24*d* and 24*e*. In the center neutral position, block 24*c*, all conduits 22, 44, 58, and 62 are sealed off or blocked. The near right and near left positions 24*b* and 24*d* control the elevation of the seat assembly 10. The near left position is utilized to raise the seat by connecting the conduits 22 and 58, while conduits 44 and 62 remain blocked, directing hydraulic fluid pressure from the pump to the working chamber 20. The near right positions 24*d* lowers the seat by connecting the conduit 22 with the conduit 62, while the conduits 44 and 58 remain blocked, permitting hydraulic fluid within the working chamber 20 to be forced by the weight of the operator out of the chamber and into the reservoir 54. The far left and far right positions 24*a* and 24*e* are utilized to change the spring rate of the suspension for the seat assembly 10. Movement of the valve 24 into either of these positions results in rotation of the rotary valve 48 so that the channel 50 therein is in alignment with the conduit 46 providing communication between the gas chambers 30 and 40. A linkage mechanism indicated generally at 64 provides a mechanical connection between the valve 24 and the rotary valve 48. This mechanism comprises, for example, a rod 66 secured to the spool of the valve 24 and having a crossbar 68 slidably retained within a slot 70 formed in a link 72 which is pivotally secured to one leg of a bellcrank 74. The other leg of the bellcrank is provided with a roller 76 which is positioned within a fork 78 secured to the rotary valve 48. A pair of springs 80 are secured to the bellcrank and bias it into a position wherein the channel 50 within the valve 48 is out of registry with the conduit 46. The slot 70 has a length sufficient to permit the spool of the valve 24 to be moved to the near right and near left positions, 24*b* and 24*d* respectively, without causing any motion of the bellcrank 74, but which causes pivoting of the bellcrank, and thus rotation of the rotary valve 48, whenever the valve 24 is moved to the far left or far right positions, 24a and 24e. The spring rate for the seat assembly 10 is increased by moving the valve to the far right position 24a wherein conduit 22 is connected with the conduit 58 and the conduit 44 is connected with the conduit 62. Hydraulic fluid under pressure will thereby be forced into the hydraulic chamber 32 of the spring accumulator 26 through the conduits 34, 22 and 58, while simultaneously venting the hydraulic chamber 42 of the reserve accumulator 36 to the reservoir 54 through the conduits 44 and 62. Since movement of the valve 24 to the far left position 24a causes the mechanical linkage 64 to rotate the rotary valve 48 into a position providing communication through the conduits 46, compressible fluid will be transferred from the chamber 30 and into the gas chamber 40. However, the valve 24 should not be maintained in position 24a so long a time that all of the compressible fluid will be forced out of the chamber 30, but instead should be held at this position only long enough to permit a transfer of a small amount of gas. Thereafter, the valve 24 is returned to its center neutral position 24c. By decreasing the mass of the gas within the chamber 30, which is the sole chamber capable of resisting collapse of the cylinder 16, the volume occupied by the gas at the same pressure will also be reduced. It will therefore, require less movement of the piston in order to achieve the same pressure within the gas chamber 30 when compared with the piston movement necessary with a larger gas volume. Stated differently, the pressures developed within the gas chamber 30 will be higher for unit piston displacements as the gas volume decreases, and conversely, the gas pressures for unit piston displacements will become smaller as the gas volume increases. Thus, transfer of the mass of gas from the chamber 30 to the chamber 40 effectively increases the spring rate for the seat assembly 10.

A decrease in the spring rate for the seat assembly 10 is accomplished by moving the valve 24 to the 24e position wherein hydraulic fluid under pressure is directed from the pump 52 through conduits 58 and 44 to the hydraulic chamber 42 while simultaneously connecting the hydraulic chamber 32 to the reservoir 54 through conduits 34, 22 and 62. Positioning of the valve 24 in its extreme right-hand position causes the actuating mechanism 64 to rotate the rotary valve 48 and permitting the channel 50 to provide fluid communication between the gas chambers 30 and 40 through the conduit 46. Hydraulic fluid under pressure entering the hydraulic chamber 42 will force a transfer of gas from the gas chamber 40 to the gas chamber 30, and the slight pressure increase within the chamber 30 resulting therefrom will cause hydraulic fluid to flow from the hydraulic chamber 32 into the reservoir 54 without affecting the elevation of the seat assembly 10. The resulting increase in the mass of the gas within the chamber 30 provides a decrease in the spring rate of the seat assembly 10.

Referring now to the modification shown in FIGURE 2, the elevation of the seat is controlled by a height control valve 84, while the spring rate for the assembly 10 is controlled by a separate and independent rate valve 88. The height control valve 84 is a three-position, manually actuated, spring centered type, and has its three positions represented in the drawings by the blocks 84a, 84c and 84b. In its center neutral position 84c, the conduit 22 communicating with the working chamber 20 and the conduit 58 which supplies hydraulic fluid under pressure from the pump 52 are blocked, as is a conduit 86 which communicates with the reservoir 54. The position represented by the 84a block is utilized to raise or elevate the seat assembly 10 and connects the conduit 22 with the conduit 58, while maintaining the conduit 86 blocked, to direct hydraulic fluid pressure from the pump 52 into the working chamber 20 to thereby extend the ram 16. Lowering the seat is accomplished by moving the valve 84 to the position represented by block 84b wherein the pressure conduit 58 remains blocked while the conduit 22 is placed in communication with the conduit 86 thereby permitting the weight of the operator acting on the piston 18 to force hydraulic fluid out of the working chamber 20 and lowering the seat assembly 10.

The rate valve 88, which is also a three-position manually actuated, spring centered type, is supplied with hydraulic fluid under pressure through a conduit 90 which connects with the supply conduit 58 from the pump 52. A separately ported conduit 92 leads to the reservoir 54, while the conduit 44 from the hydraulic chamber 42 of the reserve accumulator 36 connects with the valve 88 through a separate port. The three positions of the valve are represented in the drawing by the blocks 88a, 88b and 88c. The block 88c represents the center neutral position wherein all three conduits 44, 90 and 92 are blocked or sealed. Increase in the spring rate is accomplished by moving valve 88 to the position represented by block 88a wherein the supply conduit 90 remains blocked and the conduit 44 is placed in communication with the conduit 54. Movement of the valve 88 to this position results in rotation of the rotary valve 48 to permit the channel 50 to provide communication through the conduit 46 between the gas chambers 30 and 40. Rotation of the valve 48 is accomplished by pivotally connecting a link 67 between one arm of a bellcrank 74 and the movable member of valve 88. The bellcrank 74 is arranged to rotate the valve 48 in the same manner as that illustrated in the embodiment of FIGURE 1.

To decrease the spring rate, the valve 88 is moved to the position indicated by the block 88b wherein the reservoir conduit 92 remains blocked while the supply conduit 90 is connected with the conduit 44. In this position, hydraulic fluid under pressure is directed into the hydraulic chamber 42 forcing a transfer of the gas from chamber 40, through the conduit 46, and into the gas chamber 30, the rotary valve 48 having been rotated by the mechanism 64a to provide communication through the conduit 46. Upon returning the valve 88 to its center neutral position, indicated by the block 88c, the mass of gas within the gas chamber 30 will have been increased and the amount of piston movement required to achieve a given change in pressure will be greater, thereby decreasing the spring rate for the assembly 10.

The advantages provided by the embodiment shown in FIGURE 2 over that of FIGURE 1, are utilization of a much simpler actuating mechanism 64a for the rotary valve 48, specifically the elimination of the need for a lost-motion linkage, and the incorporation of two valves 84 and 88, which are identical in design, of the type which are readily available commercially. However, it should be recognized that the embodiment of FIGURE 2 requires that all of the change of volume within the hydraulic chamber 32 must of necessity be supplied by or accepted into the working chamber 20, which results in a change in the elevation of the seat assembly 10. This is in contrast to the circuitry of the embodiment of FIGURE 1 wherein the valve 24 operates on the hydraulic chambers 32 and 42 simultaneously, i.e., when one is being subjected to hydraulic fluid under pressure, the other is being vented to the tank and vice versa. Thus, while the elevation of the seat assembly 10 may be affected by changes in the spring rate, such changes will not be as great as those occasioned by the arrangement shown in the embodiment of FIGURE 2, and with proper sizing of the various conduits, particularly that portion of the conduit 22 extending between the working chamber 20 and the connection with the conduit 34 with respect to the sizes of the remaining portion of conduit 22 and the conduit 34, a hydraulic circuit can be achieved wherein changes in the spring rate have virtually no effect on the elevation of the seat 10.

FIGURE 3 illustrates an embodiment wherein the elevation of the seat is virtually unaffected by changes in the spring rate, and which avoids the necessity of utilizing different diameter conduits in the system. In this arrangement the seat assembly 10 and its suspension from the base member 14 is the same as in the previous two embodiments, and the control of the seat elevation is achieved by a separate valve 84 in the same manner as that shown in the embodiment of FIGURE 2. The spring rate control valve 98 operates on both of the hydraulic chambers 32 and 42 simultaneously, in much the same manner as the positions indicated by blocks 24a and 24e of the valve 24 in the embodiment of FIGURE 1, while at the same time, isolating the working chamber 20 of the hydraulic ram 16 from the hydraulic pressures being utilized to transfer the gas between the gas chambers 30 and 40. The arrangement of the accumulators 26 and 36 is the same as in the previous two embodiments, and the rotary valve interposed in the conduit 46 is controlled through a mechanism 64a in the same manner as the mechanism shown in FIGURE 2. The spring rate control valve 98 is a three-position type wherein the three positions are indicated by the blocks 98a, 98c and 98b. In the center neutral position, indicated by the block 98c, the conduit 44 leading from the hydraulic chamber 42, the pressure supply conduit 100 leading from the pump 52 through conduit 58, and the conduit 102 leading to the reservoir 54 are all blocked or sealed. The conduit 34 leading from the hydraulic chamber 32 is placed in communication with a conduit 104 which communicates with the working chamber 20 through the conduit 22. It will be apparent that changes in the volume of the working chamber 20 will be reflected in changes in the volume of the hydraulic chamber 32 whenever the valve 98 is positioned in its center neutral position indicated by the block 98c. Movement of the valve 98 out of its center neutral position and into a position to increase the spring rate, as indicated by the block 98a or to decrease the spring rate, as indicated by the block 98b results in the conduit 104 being cut off or sealed from the conduit 34. Thus the working chamber 20 of the hydraulic ram 16 will be isolated from fluid flowing within the conduit 34. On the return of the rate valve 98 to its center neutral position, communication between the conduits 34 and 104 will be reestablished, while at the same time communication between the gas chambers 30 and 40 will be prevented. Thus, changes in the spring rate for the seat assembly 10 may be made without changing the elevation of the seat assembly, except for a slight movement of the piston 18 to adjust for small changes in pressure within the gas chamber 30 which occur during the transfer of compressible fluid between the chambers 30 and 40.

It will be appreciated that each of the three embodiments of the present invention provides a means for varying the spring rate of a seat assembly, within practical limits, permits such changes to be made quickly and conveniently by an operator while seated and can be incorporated into any existing seat suspension utilizing a conventional single-acting hydraulic ram.

While three embodiments of the present invention have been shown and described herein, it will be understood that various changes and modifications may be made without departing from the spirit of the invention as defined by the scope of the appended claims.

What is claimed is:

1. In a hydraulic seat suspension for a vehicle having a seat assembly suspended by a linkage including a hydraulic ram responsive to vertical movement of the seat assembly, the improvement comprising:
   a first accumulator having a first gas chamber and a first hydraulic chamber,
   fluid passage means for connecting said first hydraulic chamber to said ram, and
   means for changing the mass of the gas within said first gas chamber,
   whereby the spring rate of said suspension may be varied.

2. In a hydraulic seat suspension according to claim 1, wherein said mass changing means comprises:
   a second accumulator having a second gas chamber and a second hydraulic chamber,
   conduit means connecting said first and second gas chambers, and
   first valve means in said conduit means and being movable between an open position wherein said gas chambers are in communication and a closed position wherein said gas chambers are isolated,
   whereby gas is permitted to flow between said gas chambers when said first valve means is in said open position and said first gas chamber only is available to resist movements of said hydraulic ram when said first valve means is in said closed position.

3. In a hydraulic seat suspension according to claim 2 and further comprising:
   a second valve means capable of selectively directing hydraulic fluid under pressure to and exhausting fluid from said first hydraulic chamber while respectively exhausting fluid from and directing fluid to said second hydraulic chamber, and
   means moving said first valve means to said open position upon actuation of second valve means,
   whereby hydraulic fluid force is utilized to transfer gas between said gas chambers.

4. In a hydraulic seat suspension according to claim 3 wherein said fluid passage means passes through said second valve means so that said hydraulic ram is isolated upon actuation of said second valve means.

5. In a seat suspension according to claim 3 and further comprising third valve means for selectively directing hydraulic fluid under pressure to and exhausting hydraulic fluid from said ram for respectively raising and lowering said seat assembly.

6. In a seat suspension according to claim 3 wherein said second valve means comprises:
   a five-position valve having;
      a central neutral position,
      second and third positions on either side of said neutral position for directing hydraulic pressure to and exhausting hydraulic fluid from said ram for respectively raising and lowering said seat assembly,
      fourth and fifth positions on either of said second and third positions for simultaneously directing hydraulic fluid under pressure to one of said hydraulic chambers while exhausting hydraulic fluid from the other of said hydraulic chambers,
   and linkage means connecting said five-position valve to said first valve means and responsive only to said valve being in either of said fourth and fifth positions to move said first valve means to said open position.

7. In a seat suspension according to claim 6 wherein said linkage means comprises:
   a lost motion link,
   a bellcrank connected between said link and said first valve means and,
   bias means for urging said bellcrank into an attitude wherein said first valve means is in said closed position.

8. In a hydraulic seat suspension according to claim 2 and further comprising:
   a second valve means capable of selectively directing hydraulic fluid under pressure and exhausting hydraulic fluid from said second hydraulic chamber for respectively increasing and decreasing the spring rate for said seat assembly.

9. In a hydraulic seat suspension according to claim 8 and further comprising:
third valve means for selectively directing hydraulic fluid under pressure to and exhausting hydraulic fluid from said ram for respectively raising and lowering said seat assembly.

10. In a seat suspension according to claim 9 wherein said third valve means is a three-position valve having:
a center neutral position,
a raise position on one side of said neutral position for directing hydraulic fluid under pressure to said ram for elevating said seat assembly, and a lower position on the other side said neutral position for exhausting hydraulic fluid from said ram for lowering said seat assembly.

11. In a seat suspension according to claim 8 wherein said second valve means is a three-position valve having:
a center neutral position,
an increase position on one side of said neutral position for directing hydraulic fluid under pressure to said second hydraulic chamber,
and a decrease position on the other side of said neutral position for exhausting hydraulic fluid from said second hydraulic chamber.

12. In a seat suspension according to claim 11 wherein said first valve means comprises a rotary valve and said moving means comprises:
a bellcrank engaging said rotary valve for moving the latter between said open and closed positions,
a link pivotally connected between said second valve means and said bellcrank,
whereby said rotary valve is in said closed position when said second valve means is in neutral position and is positioned in said open position when said second valve means is moved into either of said increase and decrease positions.

13. In a hydraulic seat suspension according to claim 4 wherein said second valve means comprises:
a three-position valve having;
a center neutral position in which said passage means is continuous,
an increase position on one side of said neutral position for simultaneously directing hydraulic fluid under pressure to said first hydraulic chamber and exhausting fluid from said second hydraulic chamber, and
a decrease position on the other side of said neutral position for simultaneously directing hydraulic fluid under pressure to said second hydraulic chamber and exhausting fluid from said first hydraulic chamber,
said fluid passage means being continuous when said valve is in said neutral position and being interrupted when said valve is in either of said increase and decrease positions,
whereby the elevation of said seat assembly will remain constant as the spring rate is being changed.

References Cited

UNITED STATES PATENTS

| | | |
|---|---|---|
| 2,474,512 | 6/1949 | Bechtold et al. |
| 2,641,106 | 6/1953 | Jelinek _____ 60—51 |
| 3,265,345 | 8/1966 | Vuichard _____ 248—400 |
| 3,300,203 | 1/1967 | Carter et al. |

EDGAR W. GEOGHEGAN, *Primary Examiner.*

U.S. Cl. X.R.

248—400; 267—1; 297—330